J. Strayer.
Seed Dropper.
N° 1,315. / 32,319.
Patented May 14, 1861.
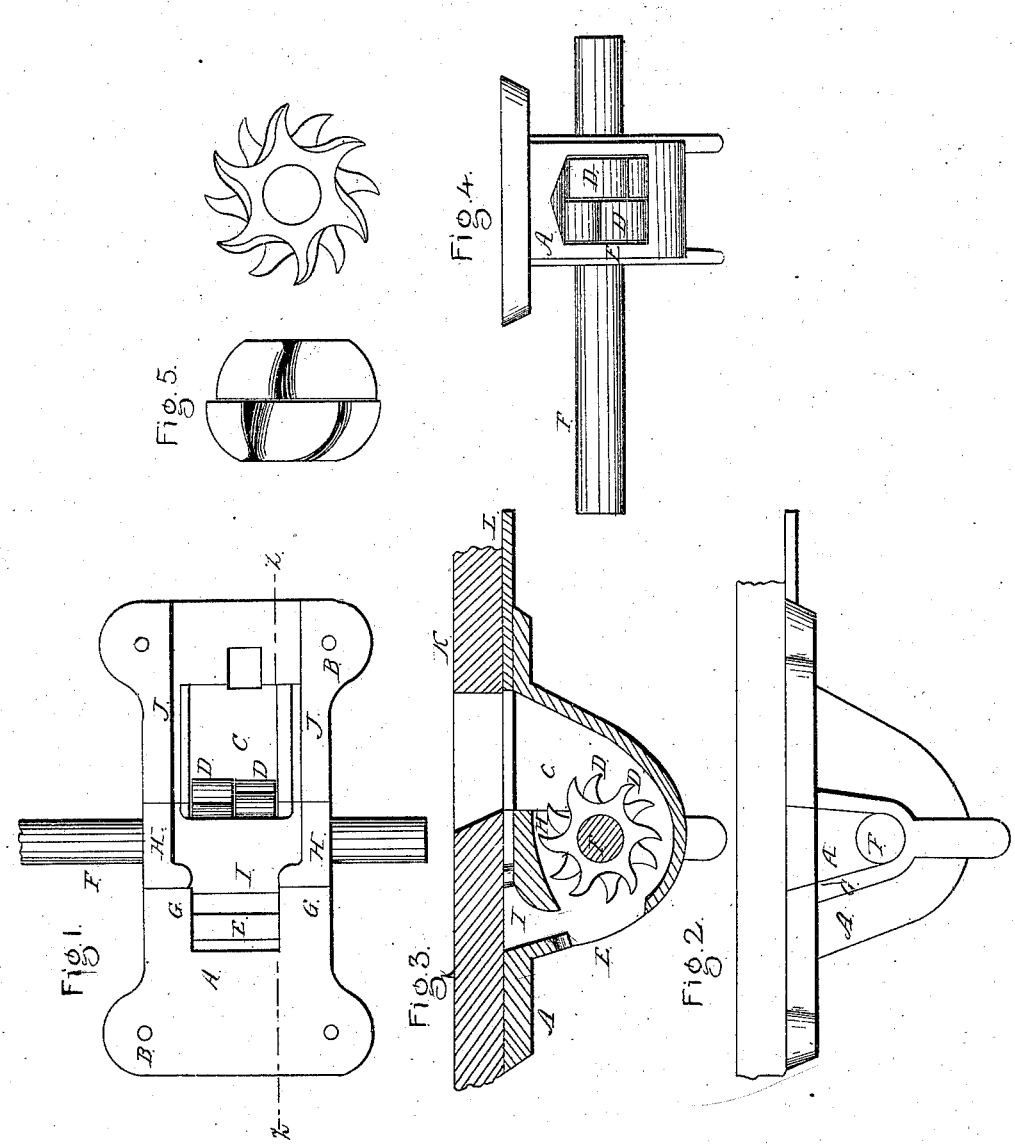
Witnesses:
R. M. Sherman
J. E. Dennis
Inventor:
Jacob Strayer
By his Attorney
J. Dennis Jr.

UNITED STATES PATENT OFFICE.

JACOB STRAYER, OF MIAMISBURG, OHIO.

IMPROVEMENT IN SEED-DRILLS.

Specification forming part of Letters Patent No. 32,319, dated May 14, 1861.

*To all whom it may concern:*

Be it known that I, JACOB STRAYER, of Miamisburg, Montgomery county, and State of Ohio, have invented certain new and useful Improvements in Seed-Drills; and I do hereby declare that the same are described and represented in the following specifications and and drawings.

The nature of my invention and improvements in seeding-drills consists in making the teeth on one part or portion of the feeding-roller opposite the spaces on the other part or portion of the roller, so as to discharge or deliver the seed more uniformly.

To enable others skilled in the art to make and use my improvements, I will proceed to describe their construction and operation, referring to the drawings, in which the same letters indicate like parts in each of the figures.

Figure 1 is a plan or top view of the feeding-roller in its case. Fig. 2 is a side elevation of the same. Fig. 3 is a section on the line $z\ z$, Fig. 1. Fig. 4 is an elevation of one end.

In these drawings A is a cast-metal box, made in the form shown in the drawings, and provided with screw-holes B B, for the screws which fasten it to the bottom of the seed-box. This seed-box A has a cavity, C, in the upper side to receive the seed which falls into it from the seed-box, and the seed is carried forward by the teeth D D of the feeding-roller, which turns in the box or cavity C until it (the seed) falls out of the opening E (shown in Fig. 4) into the delivering-tube hung below or around the opening. The teeth D D of the feeding-roller are made one-half the length of the roller, and so arranged that the teeth on one part come opposite the spaces on the other part, as shown in Figs. 1 and 3 of the drawings. This is a very great and very important advantage, as it feeds or delivers the grain far more uniformly than if the teeth extended entirely across the roller, and this is the great advantage my improvement has over the feeding-rollers heretofore used, which delivered the grain in parcels.

F is the shaft of the feeding-roller. It turns in the scores G G in the box A, which are fitted to receive the shaft, which is connected to the carrying-wheel of the drill, so as to be turned by it.

The scores G G are closed by the caps H H, fitted to them, which caps are connected by the bridge I, as shown in Fig. 1. There is a recess in the top of the box A (shown by the lines J J) for a slide to cut off the supply of seed. In Fig. 3 a section of the bottom of the seed-box is shown at K K, and the slide to shut the seed from the roller at L.

The feed-roller that I have described is made straight on the surface, or of a uniform size from end to end; but in feeding some kinds of grain it is preferable to make the roller spherical or spheroidal, as shown in Fig. 5. When made in this way the roller carries or feeds most of the grain in the center, and by making the teeth on the roller spiral they run the grain toward the center as it is delivered, which is a great advantage. When the feeding-roller is made spherical or spheriodal the cavity in the box A should be made hemispherical to correspond with the roller.

I believe I have described my improvements in feeding-rollers for seed-drills so as to enable any person skilled in the art to make and use them.

I will now state what I desire to secure by Letters Patent, to wit:

Making the teeth on one part or portion of the feeding-roller for seed-drills opposite the spaces between the teeth on the other part or portion of said roller, substantially as described, so as to deliver or discharge the seed more uniformly.

JACOB STRAYER.

Witnesses:
WILLIAM GOUDY,
G. A. GROVE.